United States Patent
Gearhart et al.

(10) Patent No.: US 10,387,843 B2
(45) Date of Patent: Aug. 20, 2019

(54) MESSAGE COMPOSITION MANAGEMENT FOR FATIGUED COMPOSERS

(75) Inventors: Rob A. Gearhart, Austin, TX (US); Liam Harpur, Dublin (IE); Mark Kelly, Dublin (IE); John Rice, Waterford (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/913,475

(22) Filed: Oct. 27, 2010

(65) Prior Publication Data
US 2012/0110395 A1    May 3, 2012

(51) Int. Cl.
*G06F 17/20*    (2006.01)
*G06Q 10/10*    (2012.01)

(52) U.S. Cl.
CPC .................. *G06Q 10/107* (2013.01)

(58) Field of Classification Search
CPC .................. H04L 112/58–5895; G06Q 10/107
See application file for complete search history.

(56) References Cited

U.S. PATENT DOCUMENTS

| | | | | |
|---|---|---|---|---|
| 4,755,140 A | * | 7/1988 | Rimland | 434/236 |
| 8,041,344 B1 | * | 10/2011 | Coughlan | H04L 12/585 455/414.1 |
| 2005/0193335 A1 | * | 9/2005 | Dorai et al. | 715/530 |
| 2007/0017531 A1 | * | 1/2007 | Large | 128/898 |
| 2008/0126481 A1 | * | 5/2008 | Chakra | H04L 51/063 709/204 |
| 2009/0089390 A1 | * | 4/2009 | Fein et al. | 709/207 |
| 2010/0021873 A1 | * | 1/2010 | Stut et al. | 434/236 |
| 2010/0049702 A1 | * | 2/2010 | Martinez et al. | 707/4 |

OTHER PUBLICATIONS

Chetan, New feature from Gmail team—Mail Goggles, published at http://www.thewwwblog.com/gmail-mail-goggles.html, Oct. 7, 2008.*
http://computersoftware.suite101.com/article.cfm/delay_sending_email.

* cited by examiner

*Primary Examiner* — Keith D Bloomquist
(74) *Attorney, Agent, or Firm* — Steven M. Greenberg, Esq.; Shutts & Bowen LLP

(57) ABSTRACT

Embodiments of the present invention provide a method, system and computer program product for message composition management for fatigued composers of electronic messages. In an embodiment of the invention, a method for message composition management for fatigued composers of electronic messages includes detecting a request by a message composer to transmit a message to a designated recipient in a messaging client executing in memory of a computer. The method also includes computing a fatigue quotient for the message composer. Finally the method includes diverting the message to a drafts folder instead of transmitting the message if the fatigue quotient exceeds a threshold value.

14 Claims, 2 Drawing Sheets

US 10,387,843 B2

MESSAGE COMPOSITION MANAGEMENT FOR FATIGUED COMPOSERS

BACKGROUND OF THE INVENTION

Field of the Invention

The present invention relates to message composition and transmission and more particularly to automated detection of composition errors in a message.

Description of the Related Art

A variety of electronic messaging systems have arisen which range from real-time instant messaging systems and wireless text pagers to asynchronous electronic mail systems. Electronic mail, a form of electronic messaging referred to in the art as e-mail, has proven to be the most widely used computing application globally. Though e-mail has been a commercial staple for several decades, due to the explosive popularity and global connectivity of the Internet, e-mail has become the preferred mode of communications, regardless of the geographic separation of communicating parties.

Composing an e-mail entails little more than drafting a message in a message field of a user interface to an e-mail client and directing the transmission of the same to one or more intended recipients. Optionally, a composed e-mail message can be saved into a "drafts" folder for subsequent editing prior to directing the transmission of the e-mail message to one or more intended recipients. Whatever the case, it will be apparent that the ease in which a message can be composed allows for rapid-fire communications with individuals about the global Internet. Of course, the convenience of e-mail is not without consequence.

In this regard, it can be so easy to compose and transmit an e-mail message that message content not intended for transmission can be transmitted nonetheless. Many can attest to the circumstance where an e-mail message sent in haste brought to bear an unwanted reaction from a recipient of the message. Recognizing the problematic nature of this circumstance, oftentimes, the end user will save a message to a drafts folder for later review in order to provide for a "cooling off" period. Further, for composed e-mail messages of substantial importance, the composer can save the composed e-mail message to the drafts folder for later proofreading or editing. In all circumstances, however, manual intervention by the message composer is required.

End users interacting with a computer day in and day out often experience fatigue that manifests itself in typographic, formatting and contextual errors of an e-mail message. An astute end user recognizing a self-condition of fatigue can manually save messages to a drafts folder for later review when the end user no longer experiences fatigue. Notwithstanding, the sheer convenience of e-mail often does not lend itself to liberal use of the drafts folder of the e-mail client.

BRIEF SUMMARY OF THE INVENTION

Embodiments of the present invention address deficiencies of the art in respect to message composition in an electronic messaging client and provide a novel and non-obvious method, system and computer program product for message composition management for fatigued composers of electronic messages. In an embodiment of the invention, a method for message composition management for fatigued composers of electronic messages includes detecting a request by a message composer to transmit a message to a designated recipient in a messaging client executing in memory of a computer. The method also includes computing a fatigue quotient for the message composer. Finally the method includes diverting the message to a drafts folder instead of transmitting the message if the fatigue quotient exceeds a threshold value.

In one aspect of the embodiment, computing a fatigue quotient includes counting a number of errors in the message. In another aspect of the embodiment, computing a fatigue quotient includes counting a number of errors in other messages recently composed by the composer. In yet another aspect of the embodiment, computing a fatigue quotient includes combining a count of a number of errors in the message and also in other messages recently composed by the composer.

The method yet further can include opening the message diverted to the drafts folder from the drafts folder. Thereafter, an ability of the composer to transmit the opened message can be delayed for a period of time. Subsequently, transmission of the opened message can be permitted. Optionally, the period of time can be computed based upon a size of the opened message.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for message composition management for fatigued composers of electronic messages. In accordance with an embodiment of the invention, a directive to transmit an electronic message such as an e-mail message or instant message can be received. Responsive to the receipt of the directive, it can be determined whether or not the composer of the electronic message is likely fatigued. For example, a log of errors from recently composed electronic messages can be consulted as can a number of errors in the electronic message to be transmitted. A fatigue quotient can be computed based upon the combination of errors in the log of errors and those in the electronic message to be transmitted. If the fatigue quotient exceeds a threshold value, the composer can be presumed to be fatigued, the electronic message can be diverted to a drafts folder and transmission of the electronic message can be delayed in order to afford time for the composer to proofread the message at a later time.

Figure 1:
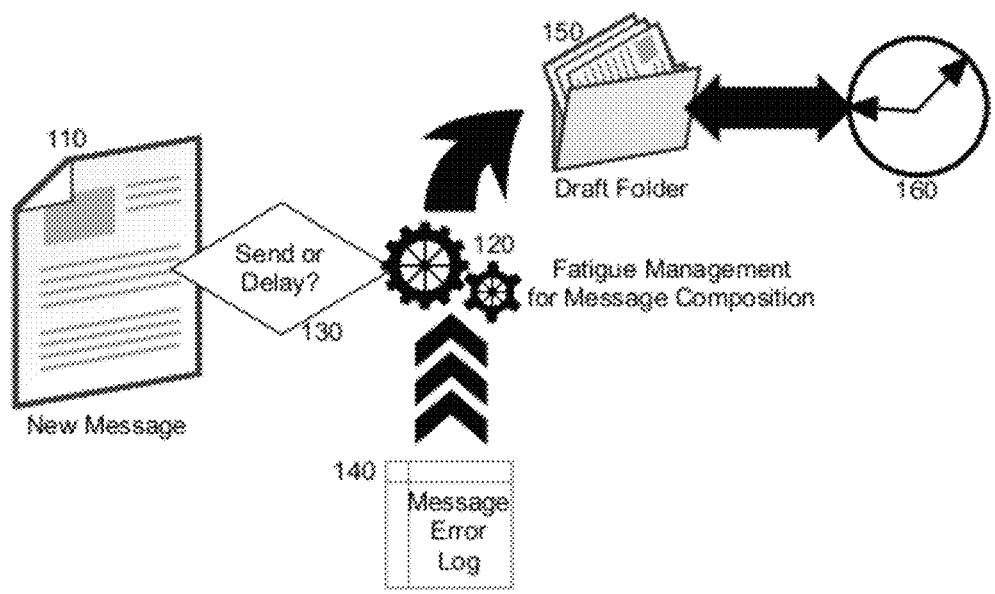
FIG. 1 is a pictorial illustration of a process for message composition management for fatigued composers of electronic messages.

In further illustration, FIG. 1 pictorially shows a process for message composition management for fatigued composers of electronic messages. As shown in FIG. 1, an electronic message 110 can be composed by a composer. Fatigue management for message composition logic 120 can compute a fatigue quotient 130 based upon a log of errors 140 for recently composed messages by the composer. Additionally, a number of errors such as typographic errors or formatting errors in the electronic message 110 can be determined. A number of errors in the log of errors 140 can be combined in consideration with the errors of the electronic message 140 to determine the fatigue quotient 130. IF the fatigue management for message composition logic 120 determines that the fatigue quotient 130 exceeds an acceptable value, the composer can be considered to be fatigued. In consequence, the electronic message 110 can be diverted to a drafts folder 150 and permitted to be transmitted only after the composer re-opens the electronic message 110 for review and a delay of time 160 has elapsed.

Figure 2:
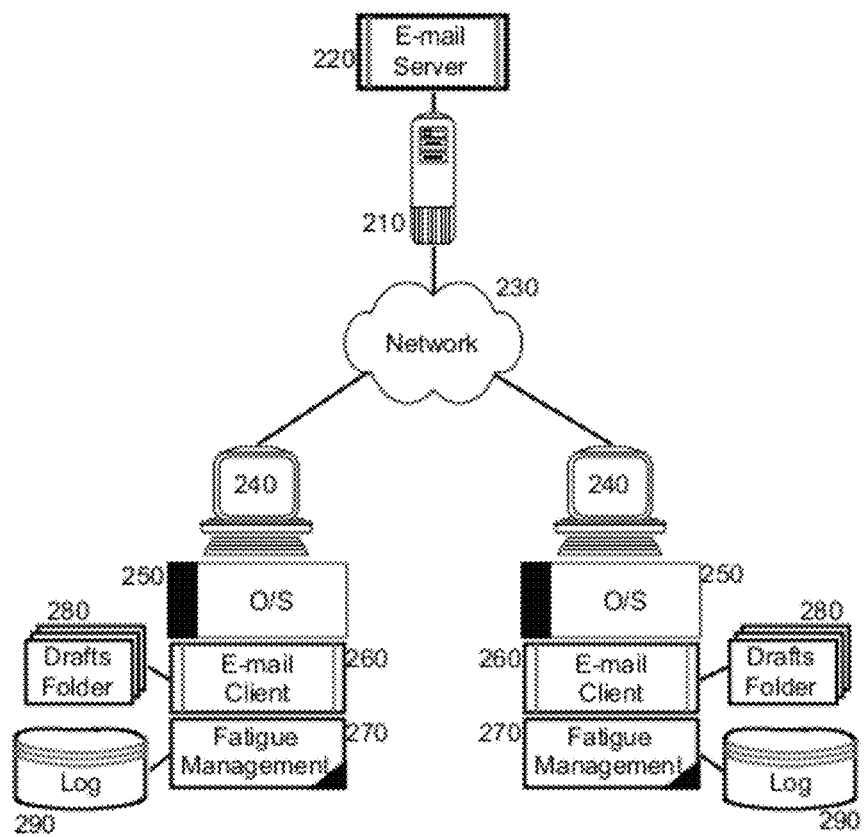
FIG. 2 is a schematic illustration of an electronic message composition data processing system configured for message composition management for fatigued composers of electronic messages; and, FIGS. 3A and 3B, taken together, are a flow chart illustrating a process for message composition management for fatigued composers of electronic messages.

The process described in connection with FIG. 1 can be implemented in an electronic message composition system such as an e-mail system. In yet further illustration, FIG. 2 schematically depicts an electronic message composition data processing system configured for message composition management for fatigued composers of electronic messages. The system can include a host computing system 210 including at least one computer that includes at least one processor and memory supporting the executing of an e-mail server 220. The host computing system 210 can be communicatively coupled to multiple different client computing devices 240, each with at least one processor and memory, each supporting the execution of an operating system 250. Each operating system 250 in turn can host the operation of an e-mail client 260 including functionality for receiving, reading, composing, transmitting and storing e-mail.

Of note, a fatigue management module 270 can be coupled to the e-mail client 260. By way of example, the fatigue management module 270 can be included as part of the e-mail client 260, or the fatigue management module 270 can be separate from the e-mail client 260, but communicatively linked to the e-mail client 260 such as through interprocess communications, or programmatically by subclassing one or more portions of the e-mail client 260 in order to access and discretionarily process events received in the e-mail client 260. In any case, the fatigue management module 270 can include program code that when executed in the memory of the client computing device 240 by way of the operating system 250, performs a process for message composition management for fatigued composers of electronic messages.

Specifically, the program code of the fatigue management module 270 can detect a directive to transmit an e-mail composed in the e-mail client 260. In response, a log of errors 290 (typographical, formatting or otherwise) detected in recently composed messages can be consulted. The log of errors 290, for instance, can be created and updated by referring to spell checking and grammar checking logic of the e-mail client 260 and recorded as a record in the log of errors 290 along with an identifier of a corresponding e-mail and a time stamp for the composition of the corresponding e-mail. The program code of the fatigue management module 270 thereafter can compute a fatigue quotient based upon the number of errors indicated by the log of errors 290 for recently composed e-mail. If the fatigue quotient exceeds a threshold value, the program code of the fatigue management module 270 can divert the e-mail to be transmitted instead to a drafts folder 280 of the e-mail client 260. Further, once the e-mail in the drafts folder 280 has been re-opened for transmission, the e-mail can be permitted to be transmitted only after a determined delay so as to afford the composer an opportunity to proofread the e-mail.

Figure 3A:
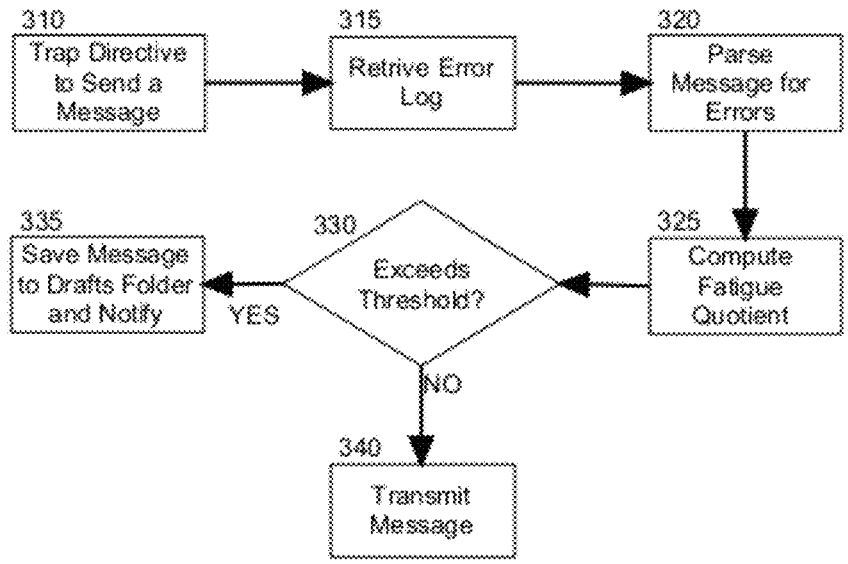
Figure 3B:
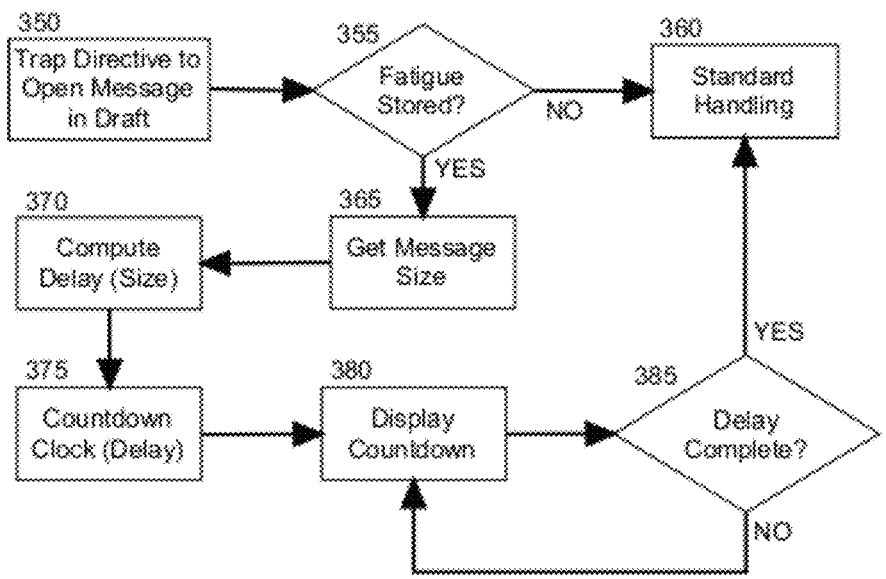

In even yet further illustration of the operation of the program code of the fatigue management module 270, FIGS. 3A and 3B, collectively illustrate a process for message composition management for fatigued composers of electronic messages. Considering first FIG. 3A, beginning in block 310, a directive to transmit a message to one or more designated recipients can be received. In response, in block 315, a log of errors can be accessed to identify a number of errors in recently composed messages. Further, in block 320, the message to be transmitted can be parsed to determine a number of errors present in the message. In block 325, a fatigue quotient can be computed accounting for the number of errors in the log of errors and also the number of errors in the message to be transmitted.

For example, the number of errors in the log of errors can be added to the number of errors in the message to be transmitted to produce the fatigue quotient. Alternatively, the number of errors in the log of errors can be weighted to be more or less important than the number of errors in the message to be transmitted before summing both. In any event, in decision block 330, if the fatigue quotient exceeds a threshold value (that itself can vary dynamically, such as according to the time of day or the number of hours or minutes the message composer has been actively interacting with the computer), in block 335 the message can be diverted to the drafts folder rather than transmitting the message to the designated recipient or recipients. Otherwise, in block 340 the message can be transmitted to the designated recipient or recipients.

Turning now to FIG. 3B, in block 350, a directive to open a message stored in the drafts folder can be detected. In decision block 355, it can be determined whether or not the message to be opened had been placed in the drafts folder due to the perceived fatigue of the composer of the message. If not, in block 360 the message can be opened from the drafts folder and handled conventionally in the e-mail client. However, if it is determined in block 355 that the message to be opened had been placed in the drafts folder due to the perceived fatigue of the composer of the message, the process can continue through block 365.

In block 365, a size of the message can be determined. Based upon the size of the message, in block 370 a delay can be computed and in block 375 transmission of the message can be delayed for a period of time consistent with the computed delay. Optionally, the message can be parsed and a complexity of the context of the message can be determined for example by mapping particular words to degrees of complexity. Consequently the complexity of the message can be taken into account in computing the delay in block 370. In any event, in block 380, an amount of time remaining in the delay can be displayed to the composer and in block 385, it can be determined whether or not the delay has completed. If so, in block 360, the message can be permitted to be transmitted through conventional handling in the e-mail client.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method for message composition management for fatigued composers of electronic messages, the method comprising:
    logging errors in different messages that are composed by a message composer in a messaging client executing in memory of a computer and subsequently transmitted by the messaging client;
    computing a number of the logged errors; and,
    subsequent to the logging and computing, detecting a request by the message composer to transmit a new message to a designated recipient in the messaging client, and in response to the detection of the request to transmit the new message performing:
    determining a number of typographic errors in the new message, computing a fatigue quotient for the message composer based upon a weighted combination of the number of typographic errors in the new message and the computed number of the logged errors for the different messages, the number of typographic errors in the new message being weighted more than the computed number of logged errors, and diverting the message to a drafts folder instead of transmitting the message if the fatigue quotient exceeds a threshold value that varies according to a time of day.

2. The method of claim 1, wherein computing a fatigue quotient comprises combining a count of a number of errors in the message and also in other messages recently composed by the composer.

3. The method of claim 1, further comprising:
    opening the message diverted to the drafts folder from the drafts folder;
    delaying an ability of the composer to transmit the opened message for a period of time; and,
    permitting transmission of the opened message once the period of time has elapsed.

4. The method of claim 3, wherein the period of time is computed based upon a size of the opened message.

5. An electronic message composition data processing system configured for message composition management for fatigued composers of electronic messages, the system comprising:
    an e-mail client executing in memory of a computer; and,
    a fatigue management module coupled to the e-mail client, the module comprising program code that when executed by the computer, logs errors in different messages that are composed by a message composer in the e-mail client computer and subsequently transmitted by the e-mail client, computes a number of the logged errors, and subsequent to the logging and computing, detects a request by the message composer to transmit a new message to a designated recipient in the messaging client, and in response to the detection of the request to transmit the new message, determines a number of typographic errors in the new message, computes a fatigue quotient for the message composer based upon a weighted combination of the number of typographic errors in the new message and the computed number of the logged errors for the different messages, the number of typographic errors in the new message being weighted more than the computed number of logged errors, and diverts the message to a drafts folder of the e-mail client instead of transmitting the message if the fatigue quotient exceeds a threshold value that varies according to a time of day.

6. The system of claim 5, wherein the fatigue quotient comprises a count of a number of errors in the message and also in other messages recently composed by the composer.

7. The system of claim 5, wherein the program code when executed by the computer further opens the message diverted to the drafts folder from the drafts folder, delays an ability of the composer to transmit the opened message for a period of time, and permits transmission of the opened message once the period of time has elapsed.

8. The system of claim 7, wherein the period of time is computed based upon a size of the opened message.

9. The system of claim 7, wherein the period of time is computed based upon a complexity of the opened message.

10. A computer program product for message composition management for fatigued composers of electronic messages, the computer program product comprising:
    a computer readable storage medium having computer readable program code embodied therewith, the computer readable program code comprising:
    computer readable program code for logging errors in different messages that are composed by a message composer in a messaging client executing in memory of a computer and subsequently transmitted by the messaging client;
    computer readable program code for computing a number of the logged errors;
    computer readable program code for, subsequent to the logging and computing, detecting a request by the message composer to transmit a new message to a designated recipient in the messaging client, and in response to the detection of the request to transmit the new message performing:
    determining a number of typographic errors in the new message, computing a fatigue quotient for the message composer based upon a weighted combination of the number of typographic errors in the new message and the computed number of the logged errors for the different messages, the number of typographic errors in the new message being weighted more than the computed number of logged errors, and diverting the message to a drafts folder instead of transmitting the message if the fatigue quotient exceeds a threshold value that varies according to a time of day.

11. The computer program product of claim 10, wherein the computer readable program code for computing a fatigue quotient comprises computer readable program code for combining a count of a number of errors in the message and also in other messages recently composed by the composer.

12. The computer program product of claim 10, further comprising:
    computer readable program code for opening the message diverted to the drafts folder from the drafts folder;
    computer readable program code for delaying an ability of the composer to transmit the opened message for a period of time; and,
    computer readable program code for permitting transmission of the opened message once the period of time has elapsed.

13. The computer program product of claim 12, wherein the period of time is computed based upon a size of the opened message.

14. The computer program product of claim 12, wherein the period of time is computed based upon a complexity of the opened message.

\* \* \* \* \*